US012625347B2

(12) United States Patent
Huang

(10) Patent No.: US 12,625,347 B2
(45) Date of Patent: May 12, 2026

(54) OPTICAL LENS, CAMERA MODULE, AND ELECTRONIC DEVICE

(71) Applicant: VIVO MOBILE COMMUNICATION CO., LTD., Guangdong (CN)

(72) Inventor: Sanfu Huang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 311 days.

(21) Appl. No.: 18/355,031

(22) Filed: Jul. 19, 2023

(65) Prior Publication Data

US 2023/0358998 A1 Nov. 9, 2023

Related U.S. Application Data

(63) Continuation of application No. PCT/CN2022/071808, filed on Jan. 13, 2022.

(30) Foreign Application Priority Data

Jan. 20, 2021 (CN) .......................... 202110074970.6

(51) Int. Cl.
*G02B 9/12* (2006.01)
*G02B 13/00* (2006.01)
(Continued)

(52) U.S. Cl.
CPC ........... *G02B 9/12* (2013.01); *G02B 13/0035* (2013.01); *G02B 13/0065* (2013.01); *G02B 5/208* (2013.01)

(58) Field of Classification Search
CPC ... G02B 9/00; G02B 9/12; G02B 9/14; G02B 9/16; G02B 13/00; G02B 13/001;
(Continued)

(56) References Cited

U.S. PATENT DOCUMENTS 8,089,704 B2 * 1/2012 Tang .................... G02B 13/004
359/772
10,031,317 B2 * 7/2018 Hsueh ................ G02B 13/0035
(Continued)

FOREIGN PATENT DOCUMENTS

CN 101241226 A 8/2008
CN 102707416 A 10/2012
(Continued)

OTHER PUBLICATIONS

First Office Action for Japanese Application No. 2023-542814, dated Jul. 31, 2024, 5 Pages.
(Continued)

*Primary Examiner* — Thong Q Nguyen
(74) *Attorney, Agent, or Firm* — BROOKS KUSHMAN P.C.

(57) ABSTRACT

An optical lens, a camera module, and an electronic device are provided. The optical lens, from an object side to an image side along an optical axis, includes: a first lens element having a positive refractive power, where an object side surface of the first lens element protrudes and an image side surface of the first lens element protrudes; a second lens element having a negative refractive power, where an object side surface of the second lens element protrudes and an image side surface of the second lens element is recessed; and a third lens element having the negative refractive power, where an object side surface of the third lens element is recessed and an image side surface of the third lens element protrudes.

20 Claims, 4 Drawing Sheets

(51) Int. Cl.
 *G02B 13/18* (2006.01)
 *G02B 5/20* (2006.01)

(58) Field of Classification Search
 CPC .............. G02B 13/0015; G02B 13/002; G02B 13/0035; G02B 13/0065; G02B 13/007; G02B 13/008; G02B 13/02; G02B 13/14; G02B 13/16; G02B 13/18
 USPC ................................. 359/350–361, 716, 784
 See application file for complete search history.

(56) References Cited

U.S. PATENT DOCUMENTS

| | | | |
|---|---|---|---|
| 2005/0253952 | A1 | 11/2005 | Minefuji |
| 2008/0186594 | A1 | 8/2008 | Jeong |
| 2008/0239510 | A1 | 10/2008 | Sato |
| 2013/0301144 | A1 | 11/2013 | Tsai et al. |
| 2014/0049840 | A1 | 2/2014 | Tsai et al. |
| 2015/0098010 | A1 | 4/2015 | Hsu et al. |
| 2015/0109687 | A1* | 4/2015 | Dai .......................... G02B 9/12 359/716 |
| 2016/0227082 | A1 | 8/2016 | Hsueh et al. |
| 2017/0276914 | A1 | 9/2017 | Yao et al. |
| 2017/0336625 | A1 | 11/2017 | Amanai et al. |
| 2018/0299656 | A1 | 10/2018 | Yonezawa et al. |
| 2019/0377158 | A1 | 12/2019 | Liao et al. |
| 2021/0373285 | A1 | 12/2021 | Peng |

FOREIGN PATENT DOCUMENTS

| | | | |
|---|---|---|---|
| CN | 103389569 | A | 11/2013 |
| CN | 103592739 | A | 2/2014 |
| CN | 104122646 | A | 10/2014 |
| CN | 105988195 | A | 10/2016 |
| CN | 107167897 | A | 9/2017 |
| CN | 112882213 | A | 6/2021 |
| JP | 2006308789 | A | 11/2006 |
| JP | 2008241999 | A | 10/2008 |
| JP | 2009036788 | A | 2/2009 |
| JP | 2009098513 | A | 5/2009 |
| JP | 2009169092 | A | 7/2009 |
| JP | 2010276836 | A | 12/2010 |
| JP | 2017134104 | A | 8/2017 |
| JP | 2017207658 | A | 11/2017 |
| JP | 2018169425 | A | 11/2018 |
| JP | 2021189426 | A | 12/2021 |
| TW | 201629573 | A | 8/2016 |
| WO | 2017130478 | A1 | 8/2017 |

OTHER PUBLICATIONS

First Office Action for Chinese Application No. 202110074970.6, dated Apr. 18, 2022, 6 Pages.
International Search Report and Written Opinion for Application No. PCT /CN2022/071808, dated Mar. 29, 2022, 10 Pages.
First Indian Office Action for Indian Patent Application No. 202327052633 mailed Oct. 27, 2025. 9 pages.

* cited by examiner

Relative illumination (RI)

Axial chromatic aberration

OPTICAL LENS, CAMERA MODULE, AND ELECTRONIC DEVICE

CROSS-REFERENCE TO RELATED APPLICATIONS

This application is a continuation of PCT International Application No. PCT/CN2022/071808 filed on Jan. 13, 2022, which claims priority to Chinese Patent Application No. 202110074970.6, filed on Jan. 20, 2021, which are incorporated herein by reference in their entireties.

TECHNICAL FIELD

This application relates to the field of optical imaging technologies, and in particular, to an optical lens, a camera module, and an electronic device.

BACKGROUND

Currently, with the continuous progress of smart terminal technologies, a photo shooting function has become an indispensable part of a smart phone, and users have increasingly higher requirements for photo quality. Therefore, requirements for cameras are also increasingly higher. Requirements for photo quality, focusing speed, or a zoom ratio are all becoming increasingly higher.

Currently, a quantity of pixels of a main camera of a smart terminal may be more than that of some single-lens reflex cameras, and may be as high as 50 million pixels or even higher. However, there is still a significant gap compared to single-lens reflex cameras in terms of long focus and high magnification zoom lenses. An ordinary configuration of a smart phone's camera usually includes: a main camera with an equivalent focal length of approximately 24 mm to 25 mm; an ultra-wide angle camera with an equivalent focal length of approximately 16 mm to 18 mm; and a long-focus lens with an equivalent focal length of 50 mm to 130 mm. An optical zoom ratio of the camera with the above configuration may only be a maximum of 5.2×, which is significantly insufficient in a shooting scene at a greater distance when higher magnification is required.

SUMMARY

This application proposes an optical lens, a camera module, and an electronic device, which can provide a small high magnification lens for a mobile terminal, thereby increasing a zoom ratio, and meeting requirements for lens magnification in shooting scenes at a greater distance.

To achieve the foregoing objective, the following solution is used in this application.

According to a first aspect, an embodiment of this application provides an optical lens. The optical lens, from an object side to an image side along an optical axis, includes:

a first lens element having a positive refractive power, where an object side surface of the first lens element protrudes and an image side surface of the first lens element protrudes;

a second lens element having a negative refractive power, where an object side surface of the second lens element protrudes and an image side surface of the second lens element is recessed; and a third lens element having the negative refractive power, where an object side surface of the third lens element is recessed and an image side surface of the third lens element protrudes.

Abbe numbers of the first lens element, the second lens element, and the third lens element are V1, V2, and V3 respectively, satisfying:

$$3.4 < \frac{V1}{V2} < 3.9, \text{ and } 0.45 < \frac{V2}{V3} < 0.55.$$

An effective focal length of the optical lens is f, and f>20 mm.

According to a second aspect, an embodiment of this application provides a camera module. The camera module includes the optical lens according to the first aspect and an image sensor. The image sensor is disposed on the image side of the optical lens.

According to a third aspect, an embodiment of this application provides an electronic device, including the camera module according to the second aspect.

A beneficial effect brought by the technical solution provided in the embodiments of this application at least includes providing an optical lens. The optical lens, from an object side to an image side along an optical axis, includes: a first lens element having a positive refractive power, where an object side surface of the first lens element protrudes and an image side surface of the first lens element protrudes; a second lens element having a negative refractive power, where an object side surface of the second lens element protrudes and an image side surface of the second lens element is recessed; and a third lens element having the negative refractive power, where an object side surface of the third lens element is recessed and an image side surface of the third lens element protrudes. An effective focal length of the optical lens is f, and f>20 mm. A camera module composed of the foregoing optical lens, when combined with a small-sized image sensor, can have an equivalent focal length of more than 200 mm and a zoom ratio of as high as 10×, so that an electronic device equipped with the camera module provided in the embodiments of this application, such as a mobile terminal, meets long focal length requirements for shooting scenes at a greater distance.

DETAILED DESCRIPTION

The following clearly describes the technical solutions in the embodiments of this application with reference to the accompanying drawings in the embodiments of this application. Apparently, the described embodiments are some rather than all the embodiments of this application. All other embodiments obtained by a person of ordinary skill in the art based on the embodiments of this application without creative efforts shall fall within the protection scope of this application.

The terms "first", "second", and the like in the description and the claims of this application are used to distinguish between similar objects, and do not need to be used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and a character "/" generally represents an "or" relationship between associated objects.

The following describes in detail the optical lens, the camera module, and the electronic device provided in the embodiments of this application through specific embodiments and application scenarios thereof with reference to the accompanying drawings.

Figure 1:
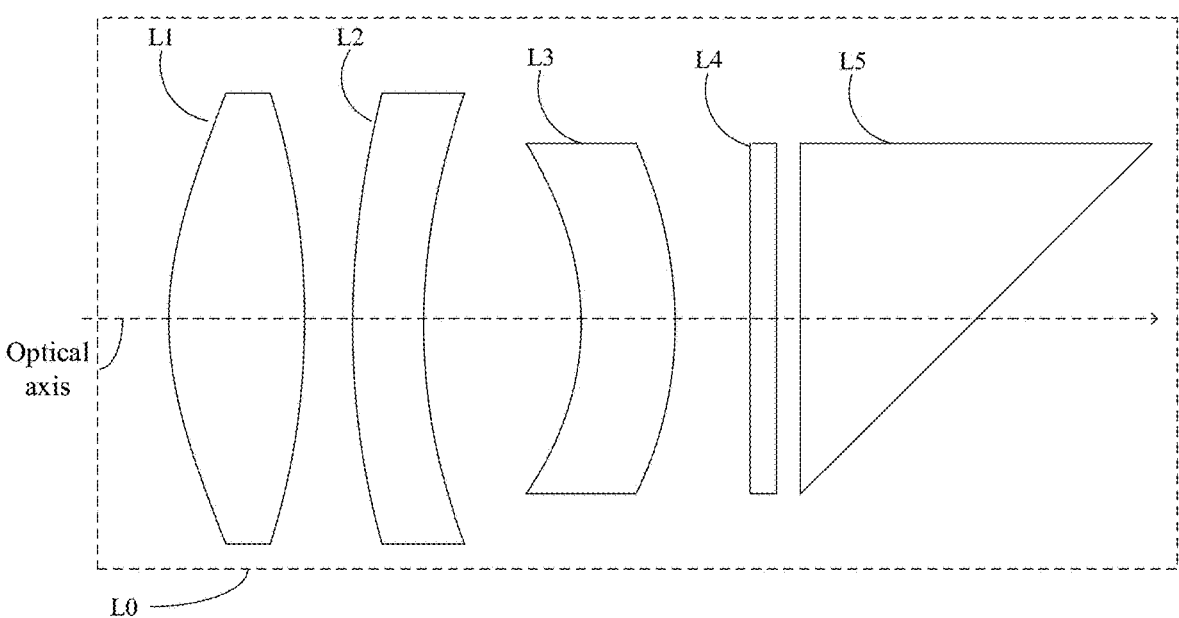
FIG. 1 is a schematic structural diagram of an optical lens according to an embodiment of this application.

Refer to FIG. 1. FIG. 1 is a schematic structural diagram of an optical lens according to an embodiment of this application. The optical lens, from an object side to an image side along an optical axis, includes:

a first lens element L1 having a positive refractive power, where an object side surface of the first lens element L1 protrudes and an image side surface of the first lens element L1 protrudes;

a second lens element L2 having a negative refractive power, where an object side surface of the second lens element L2 protrudes and an image side surface of the second lens element L2 is recessed; and a third lens element L3 having the negative refractive power, where an object side surface of the third lens element L3 is recessed and an image side surface of the third lens element L3 protrudes.

Abbe numbers of the first lens element, the second lens element, and the third lens element are V1, V2, and V3 respectively, satisfying:

$$3.4 < \frac{V1}{V2} < 3.9, \text{ and } 0.45 < \frac{V2}{V3} < 0.55.$$

An effective focal length of the optical lens L0 is f, and f>20 mm.

For example, the optical lens L0 shown in FIG. 1, from the object side to the image side along the optical axis, includes the first lens element L1, the second lens element L2, and the third lens element L3. The first lens element L1 is a biconvex lens, and two surfaces of the L1 protrude towards the object side and the image side respectively along the optical axis. The second lens element L2 is a convex-concave lens, the object side surface of the L2 protrudes toward the object side along the optical axis, and the image side surface of the L2 is recessed toward the image side along the optical axis. The third lens element L3 is a concave-convex lens, the object side surface of the L3 is recessed toward the object side along the optical axis, and the image side surface of the L3 protrudes toward the image side along the optical axis.

Specifically, a lower Abbe number means worse dispersion control. To ensure color performance of the optical lens, it is required that the Abbe numbers of the first lens element, the second lens element, and the third lens element are V1, V2, and V3 respectively, satisfying the following proportion:

$$3.4 < \frac{V1}{V2} < 3.9, \text{ and } 0.45 < \frac{V2}{V3} < 0.55.$$

In addition, there is usually a relationship between an Abbe number of a lens element and a refractive index of the lens: when the Abbe number of the lens is higher, dispersion control of the lens is better and a refractive index of a corresponding material of the lens is lower.

Specifically, the effective focal length of the optical lens L0 is f, and f>20 mm. Refer to the optical lens L0 shown in FIG. 1. A combined focal length of the first lens element L1, the second lens element L2, and the third lens element L3 is greater than 20 mm. When applied to an electronic device such as a mobile terminal, the optical lens combined with a small-sized image sensor can have an equivalent focal length of more than 200 mm and a zoom ratio of 10×, and can optimize a field of view. The small-sized image sensor may be a complementary metal oxide semiconductor (CMOS) having a diagonal length of an effective imaging size ranging from 3.8 mm to 4.4 mm and a charge coupled device (CCD) photosensitive sensor.

Specifically, the effective focal length (EFL) mentioned in this application means an actual focal length of the optical lens or a lens element.

The equivalent focal length means a length of a diagonal line in an imaging area of a camera photoelectric sensor (an image sensor) chip, which corresponds to an actual focal length of a 35 mm camera lens when it is equivalent to a diagonal length (42.27 mm) of a 35 mm camera frame.

Equivalent focal length=effective focal length*lens conversion coefficient.

Lens conversion coefficient=43.3 mm (a length of a diagonal line of an imaging area of a full-frame camera sensor)÷(the diagonal length of the imaging area of the image sensor).

Usually, a smaller size of a sensor (a smaller diagonal length of an image area) means a higher lens conversion coefficient of the sensor. For example, if the lens conversion coefficient of the sensor of a full-frame camera is 1, an equivalent focal length of an optical lens with f=20 mm on the full-frame camera is also 20 mm.

For example, a 1/2.7-inch image sensor with a diagonal line of approximately 6.64 mm and a lens conversion coefficient of approximately 6.5, combined with an optical lens of f=20 mm, has an equivalent focal length of approximately 130 mm.

Therefore, the optical lens provided in this application, combined with the small-sized sensor, can have an equivalent focal length of more than 200 mm. If a ¼-inch image sensor with a diagonal line of approximately 4 mm is used, a lens conversion coefficient can be as high as 10.82. If a ⅓-inch image sensor with a diagonal line of approximately 3 mm is used, a lens conversion coefficient can be as high as 14.42.

In addition, because the sensor is small, the camera module composed of this optical lens and the small-sized sensor can be mounted on an electronic device such as a mobile phone, a tablet, so that users' needs for long focal lengths are met.

Optionally, refractive indexes of the first lens element L1, the second lens element L2, and the third lens element L3 are N1, N2, and N3 respectively, satisfying:

N1<N3<N2.

Specifically, the first lens element L1 may be a material with a lower refractive index, such as glass. Lenses made of materials with lower refractive indexes usually have better dispersion control. The second lens element L2 and the third lens element L3 may be a plastic (resin) lens with a higher refractive index in combination with a plastic (resin) lens with a lower refractive index, which can reduce costs and do not damage dispersion performance of the optical lens L0.

Specifically, the refractive index N1 of the first lens element L1 is smaller than the refractive index N3 of the third lens element L3, and the refractive index N3 of the third lens element L3 is smaller than the refractive index N2 of the second lens element L2.

Figure 2:
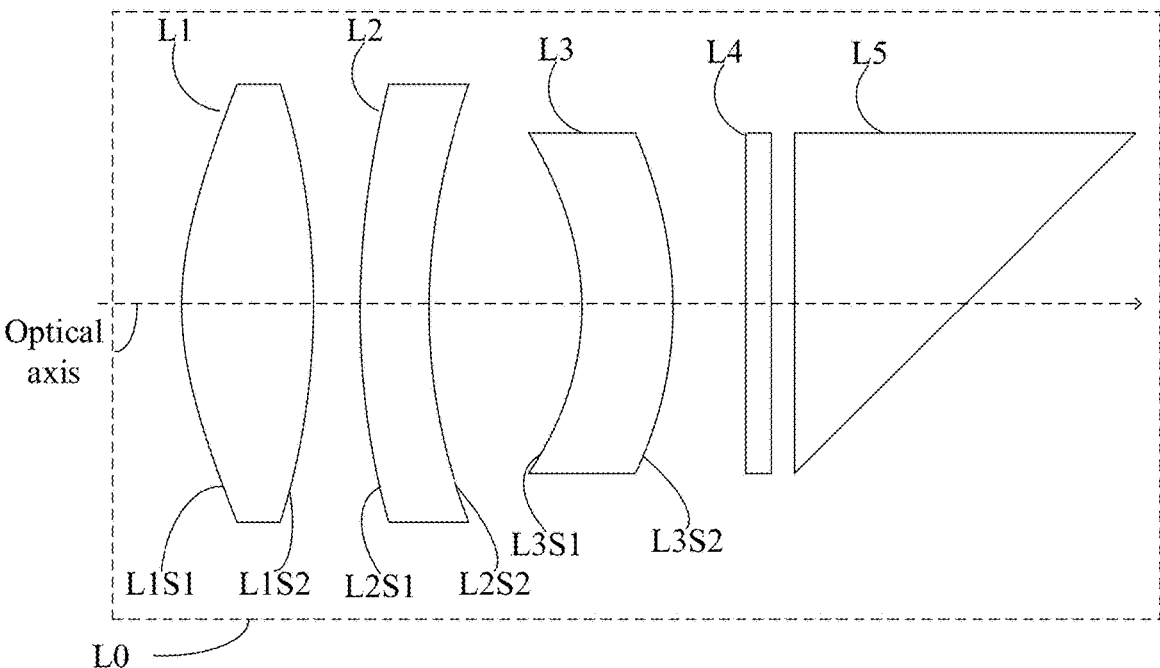
FIG. 2 is a schematic structural diagram of another optical lens according to an embodiment of this application.

Refer to FIG. 2. The L1, the L2, the L3, and each of their surfaces are labeled. The object side surface L1S1 of the first lens element L1 is a spherical surface, a curvature radius of the object side surface L1S1 is R1, and 0 mm<R1<10 mm.

Specifically, if the foregoing L1S1 is a convex surface, it can effectively avoid stray light such as ghost generated by the long focus lens. In addition, a glass lens with a low refractive index can effectively suppress dispersion.

Optionally, the image side surface L1S2 of the first lens element L1 is a spherical surface, a curvature radius of the image side surface L1S2 is R2, and −28 mm<R2<−10 mm.

The object side surface L2S1 of the second lens element L2 is an aspheric surface, a curvature radius of the object side surface is R3, and 20 mm<R3<50 mm.

Specifically, the L1S2 cooperates with the L2S1 to reduce an angle of incident light and avoid stray light.

Optionally, the image side surface L2S2 of the second lens element L2 is an aspheric surface, a curvature radius of the image side surface L2S2 is R4, and 10 mm<R4<25 mm.

Specifically, a curved surface of the L2S2 is relatively flat, so that spherical aberration can be reduced.

Optionally, the object side surface L3S1 of the third lens element L3 is an aspheric surface, a curvature radius of the object side surface L3S1 is R5, and −10 mm<R5<−1 mm.

The image side surface L3S2 of the third lens element L3 is an aspheric surface, a curvature radius of the image side surface L3S2 is R6, and −13 mm<R6<−2 mm.

Specifically, when the R5 and the R6 are within the above ranges, the lens element has a negative refractive power so that the optical lens provided in the embodiments of this application can implement an effect of a modulation transfer function (MTF) by controlling the curvature of field and the aberration when using an image sensor with a length of a diagonal line of 3.8 mm to 4.4 mm.

Optionally, effective focal lengths of the first lens element L1, the second lens element L2, and the third lens element L3 are f1, f2, and f3 respectively, satisfying:

8.0 mm<f1<15 mm;
−80 mm<f2<−40 mm; and
−30 mm<f3<−15 mm.

Specifically, after the L1, the L2, and the L3 are combined, the effective focal length f of the optical lens L0 is greater than 20 mm.

Optionally, center thicknesses of the first lens element, the second lens element, and the third lens element are CT1, CT2, and CT3 respectively, satisfying:

1 mm<CT1<3 mm;
1 mm<CT2<4 mm; and
1 mm<CT3<4 mm.

Specifically, a thinner center thickness can make the optical lens provided in the embodiments of this application smaller and easier to be mounted on a mobile terminal, such as a mobile phone and a tablet.

Optionally, the optical lens further includes an aperture. The aperture is disposed between the first lens element and the second lens element.

Figure 3:
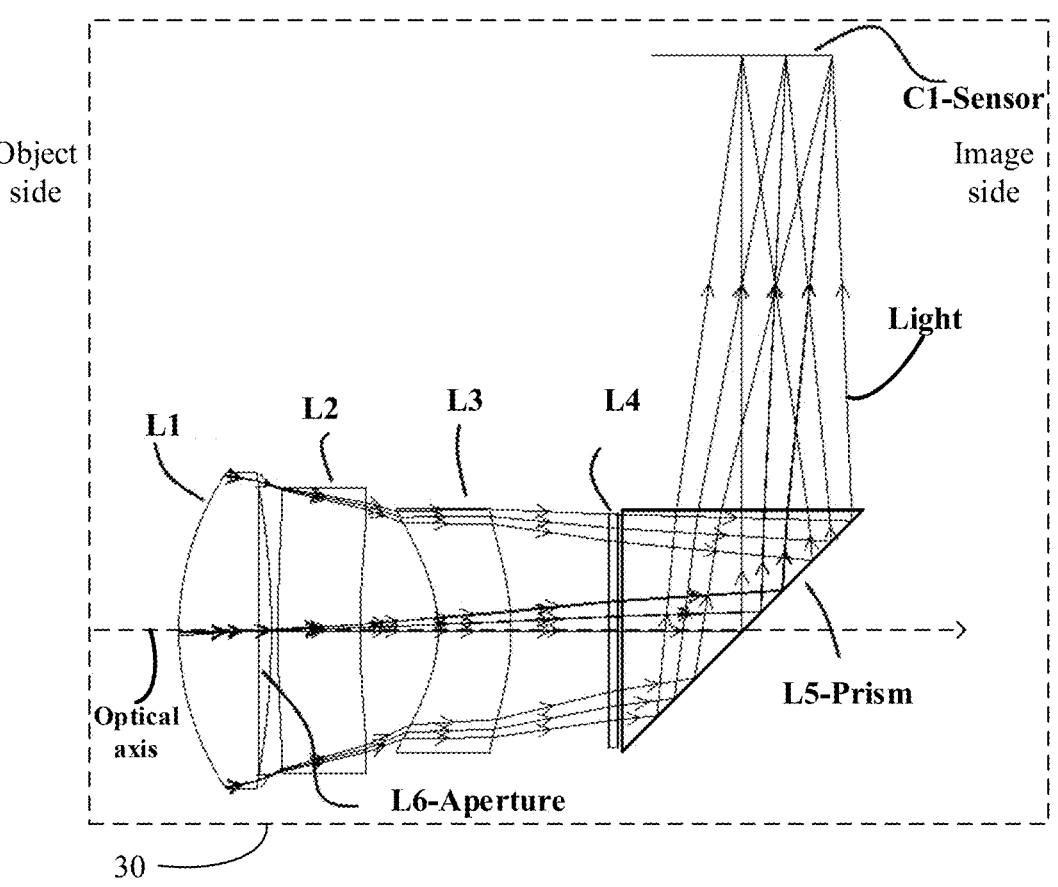
FIG. 3 is a schematic structural diagram of a camera module according to an embodiment of this application.

Specifically, the aperture is located between the L1 and the L2. Refer to FIG. 3. The aperture is placed between the L1 and the L2 so that aberration can be effectively controlled and sensitivity can be better produced.

Optionally, refer to FIG. 2. The optical lens further includes an infrared filter L4, and the infrared filter L4 is disposed on an image side of the third lens element L3.

Optionally, refer to FIG. 2. The optical lens further includes a prism L5, and the prism L5 is disposed on the image side of the third lens element L3 and is used to change a direction of light.

Specifically, refer to FIG. 3. The infrared filter L4 and the prism L5 are disposed in sequence on the image side of the third lens element L3. The prism L5 is provided so that an image sensor C1 can be installed above the lens's elements L1 to L3, and above L4 and L5, and the C1 does not need to be installed along an optical axis on the image side of the optical lens, thereby reducing a volume of the optical lens and saving space when the optical lens is mounted on the electronic device.

Specifically, the optical lens provided in the embodiments of this application can be combined with the image sensor to form a camera module, which is applied to an electronic device (such as a mobile phone and a tablet). The camera module can be used in combination with an image sensor (photosensitive elements such as a CDD and a CMOS) having a diagonal length of an effective imaging size ranging from 3.8 mm to 4.4 mm, and is applicable for visible light in a wavelength range of 400 nm to 700 nm.

Specifically, FIG. 4 to FIG. 7 shows performance parameters of an optical lens provided in the embodiments of this application.

Specifically, the effective focal length EFL of the optical lens L0 is 24 mm<EFL<25 mm, an aperture value of the optical lens L0 is F3.5, and a diagonal field of view (Diagonal Field of View, DFOV) of the optical lens L0 is 9.4°. The equivalent focal length can be as high as 250 mm, and the zoom ratio can be as high as 10×. The DFOV is optimized and ranges below 10 degrees.

Figure 4:
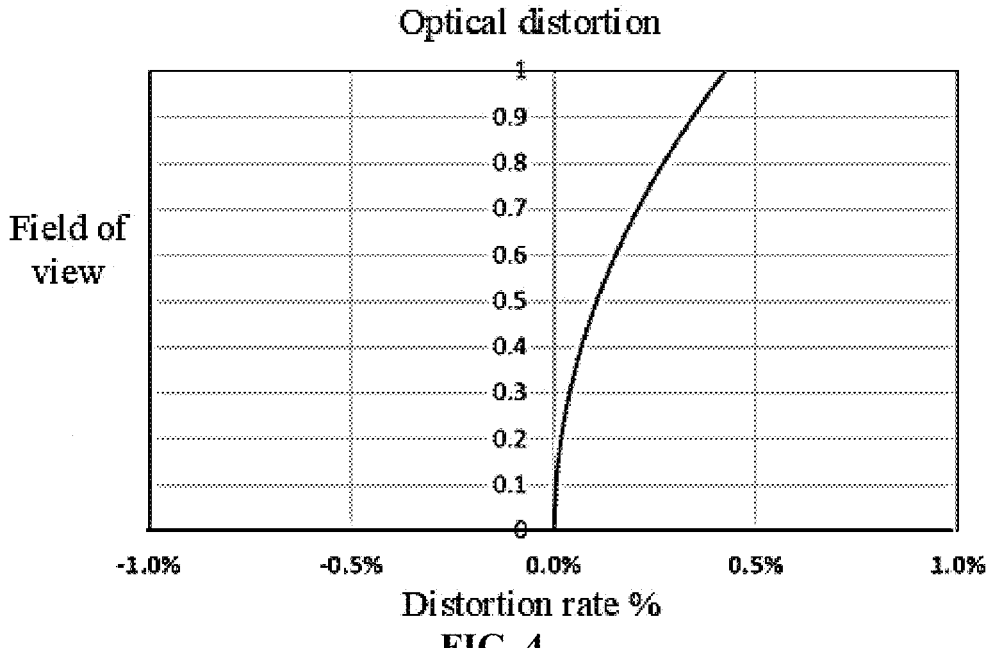
FIG. 4 is an optical distortion curve of an optical lens according to an embodiment of this application.

FIG. 4 shows optical distortion, and −1%<optical distortion<1%.

Figure 5:
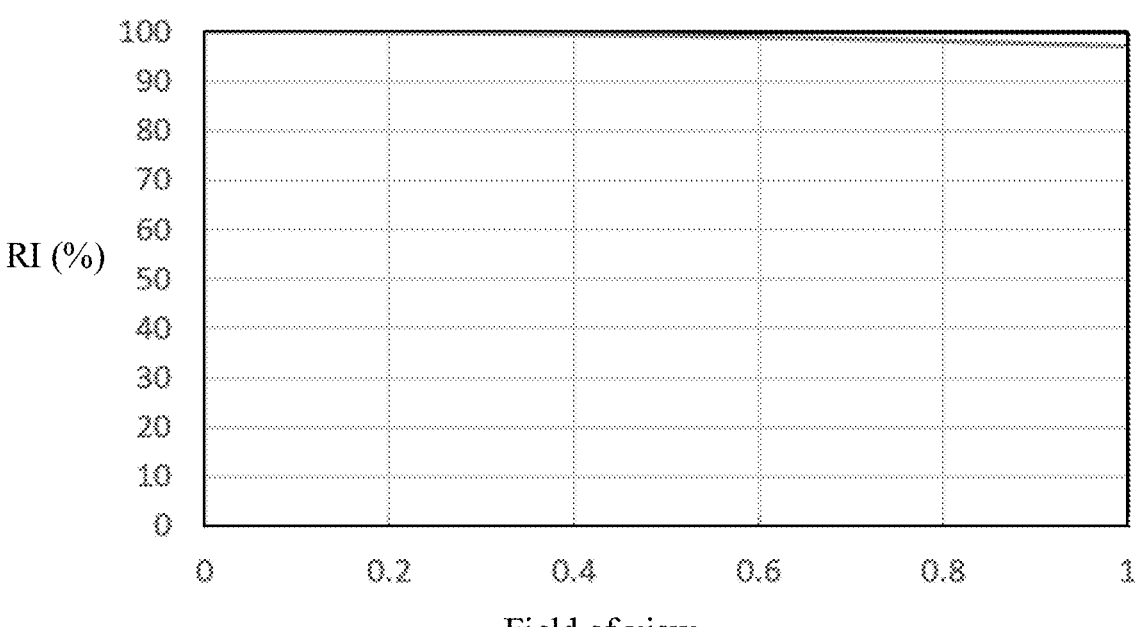
FIG. 5 is a relative illumination curve of an optical lens according to an embodiment of this application.

FIG. 5 shows relative illumination, and the relative illumination>95%.

Figure 6:
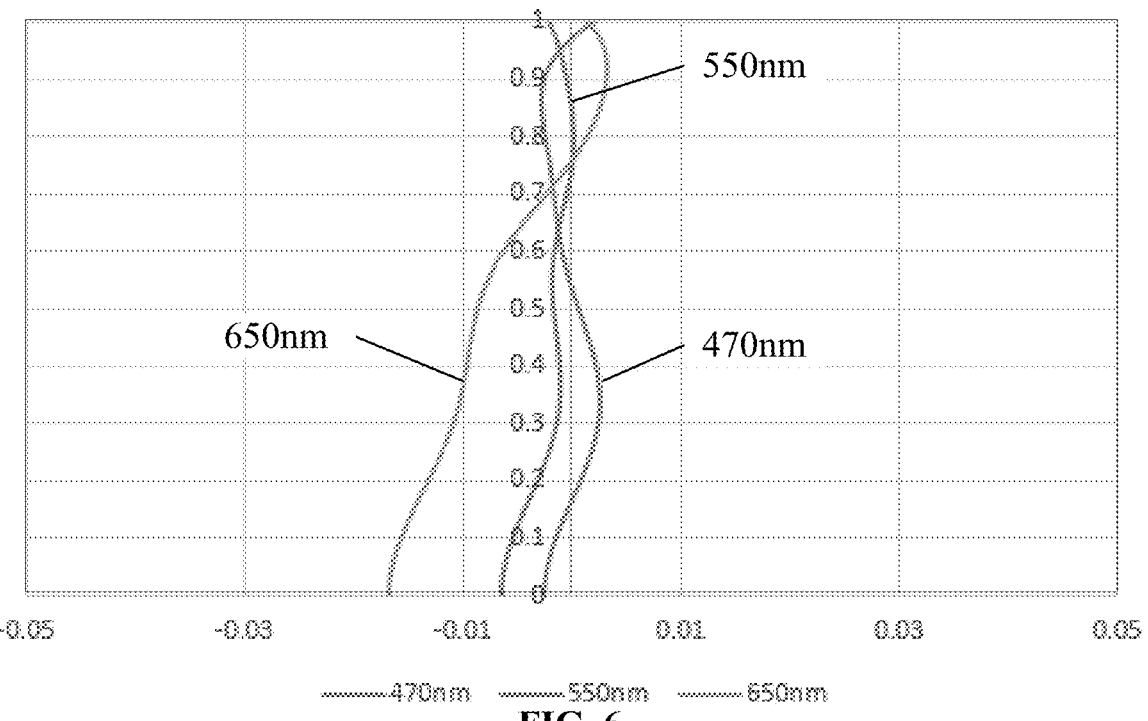
FIG. 6 is an axial chromatic aberration curve of an optical lens according to an embodiment of this application.

FIG. 6 shows axial chromatic aberration and shows axial chromatic aberration of light with wavelengths of 470 nm, 550 nm, and 650 nm respectively.

Figure 7:
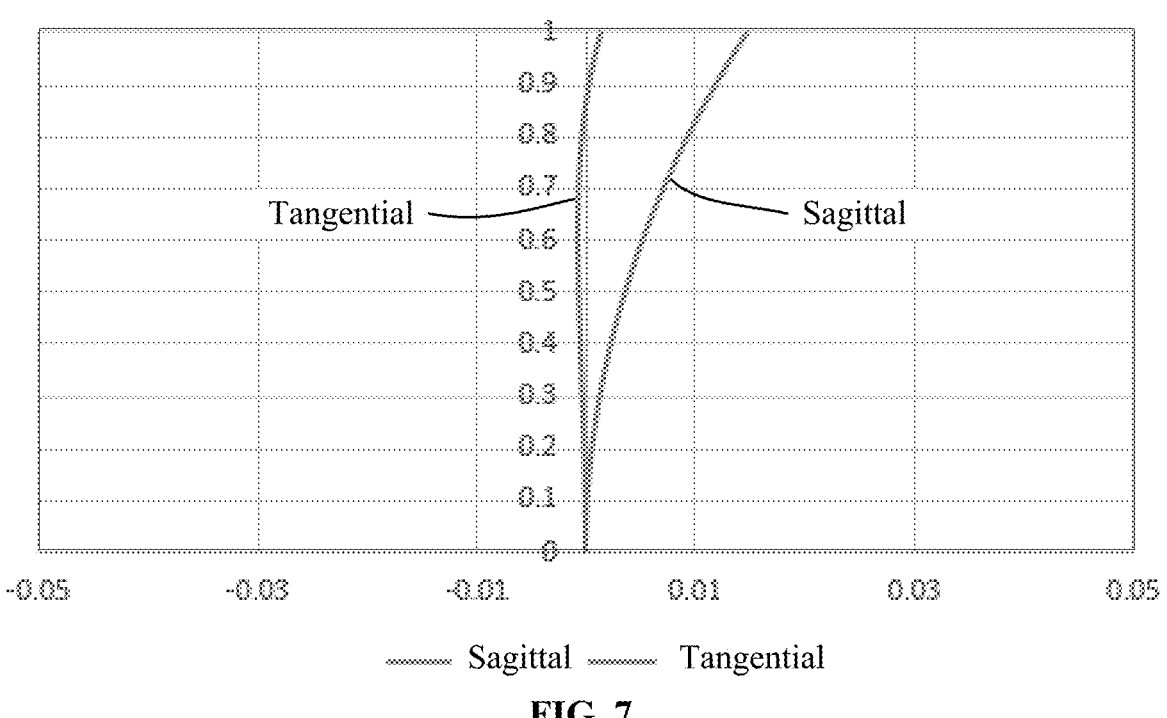
FIG. 7 is a curvature-of-field curve of an optical lens according to an embodiment of this application.

FIG. 7 shows curvature of field and shows sagittal curvature of field and tangential curvature of field respectively.

Specifically, because two surfaces of the L2 and two surfaces of the L3 are both aspheric, the aspheric coefficient is obtained based on an aspheric surface equation, and specific implementation parameters are shown in Table 1.

The aspheric surface equation is as follows:

$$z = \frac{cr^2}{1 + \sqrt{1 - (1 + k^2)c^2 r^2}} + \sum_{i=1}^{N} \alpha_i \rho^{2i}$$

The parameters are:
z: a position on a z-axis of an aspheric surface;
c: a reciprocal of a curvature radius;
r: a position on an R-axis of an aspheric surface;
k: a conic coefficient;
$\alpha_i$: an aspheric coefficient A; and
ρ: a position equivalent to the position on the R-axis of the aspheric surface.

TABLE 1

Table of comparison between optical lens parameters

| Lens element | Surface | Curvature radius 1/C | Center thickness | Refractive index/Abbe number | Conic coefficient K | Aspheric coefficient A $\alpha_2$ | Aspheric coefficient B $\alpha_3$ | In a unit of mm Aspheric coefficient C $\alpha_4$ |
|---|---|---|---|---|---|---|---|---|
| L1 | L1S1 | 6.511 | 2.091 | 1.44/95 | 0 | 0 | 0 | 0 |
| L1 | L1S2 | −18.888 | −0.278 | | 0 | 0 | 0 | 0 |
| Aperture | | Infinity | 0.428 | | 0 | 0 | 0 | 0 |
| L2 | L2S1 | 32.179 | 1.857 | 1.61/25.9 | 0 | −0.000508 | −0.000001 | −0.000001 |
| L2 | L2S2 | 17.108 | 1.763 | | −5.741031 | −0.001047 | 0.000002 | −0.000006 |
| L3 | L3S1 | −3.263 | 1.652 | 1.53/53.6 | −1.780647 | 0.000073 | 0.000347 | −0.000033 |
| L3 | L3S2 | −5.302 | 2.212 | | −2.425179 | 0.001970 | 0.000187 | −0.000011 |

The aspheric coefficients A, B, and C are coefficient values when the i=1, the i=2, and the i=3 respectively.

In conclusion, an embodiment of this application provides an optical lens. When the camera module composed of the optical lens cooperates with a small-sized image sensor to form the camera module, and is mounted on an electronic device, the equivalent focal length can be more than 200 mm and the zoom ratio can be 10×, so that the electronic device equipped with the camera module provided in the embodiments of this application, such as a mobile terminal, can meet long focal length requirements of a farther shooting scene.

Refer to FIG. 3. An embodiment of this application provides a camera module 30. The camera module 30 includes an optical lens L0 according to any embodiment of this application and an image sensor C1. The image sensor C1 is located on the image side of the optical lens L0.

Specifically, an optical signal is transmitted to the image sensor C1 by using the optical lens L0. The image sensor C1 converts the optical signal into an electrical signal corresponding to the optical signal of an image, and then transmits the electrical signal to an electronic device equipped with the camera module 30.

Specifically, an effective imaging size of the image sensor C1 is that a diagonal length ranges from 3.8 mm to 4.4 mm.

Specifically, the image sensor C1 and the optical lens L0 are combined so that the zoom ratio can be 10× and the equivalent focal length can be more than 200 mm, thereby meeting use requirements for long focal length.

An embodiment of this application further provides an electronic device, including the camera module according to an embodiment of this application. The electronic device is further equipped with a display module such as a display screen, through which users can find a view and take photos.

The electronic device in the embodiments of this application may be a mobile electronic device or a non-mobile electronic device. For example, the mobile electronic device may be a mobile phone, a tablet computer, a notebook computer, a palmtop computer, a vehicle-mounted device, a wearable device, an ultra-mobile personal computer (UMPC), a netbook, a personal digital assistant (PDA), or the like. The non-mobile electronic device may be a personal computer (PC), a television (TV), a teller machine, a self-service machine, or the like. This is not specifically limited in the embodiments of this application.

The electronic device in the embodiments of this application may be an apparatus with an operating system. The operating system may be an Android operating system, an iOS operating system, or another possible operating system. This is not specifically limited in this embodiment of this application.

The electronic device provided in the embodiments of this application can be provided with the optical lens shown in FIG. 1 to FIG. 7 and the camera module shown in FIG. 3, so that a zoom ratio of 10× and an equivalent focal length of more than 200 mm can be implemented, thereby meeting use requirements for long focal length.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The software product is stored in a storage medium (such as a read-only memory (ROM)/random access memory (RAM), a magnetic disk, or an optical disc), and includes several instructions for instructing a terminal (which may be a mobile phone, a computer, a server, an air conditioner, a network device, or the like) to perform the methods described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. An optical lens, from an object side to an image side along an optical axis, comprising:

a first lens element having a positive refractive power, wherein an object side surface of the first lens element protrudes and an image side surface of the first lens element protrudes;

a second lens element having a negative refractive power, wherein an object side surface of the second lens element protrudes and an image side surface of the second lens element is recessed; and a third lens element having the negative refractive power, wherein an object side surface of the third lens element is recessed and an image side surface of the third lens element protrudes; wherein Abbe numbers of the first lens element, the second lens element, and the third lens element are V1, V2, and V3 respectively, satisfying:

3.4<V1/V2<3.9, and 0.45<V2/V3<0.55; and an effective focal length of the optical lens is f, and 20 mm<f<25 mm.

2. The optical lens according to claim 1, wherein the object side surface of the first lens element is a spherical surface, a curvature radius of the object side surface is R1, and 0 mm<R1<10 mm.

3. The optical lens according to claim 1, wherein the image side surface of the first lens element is a spherical surface, a curvature radius of the image side surface is R2, and −28 mm<R2<−10 mm; and the object side surface of the second lens element is an aspheric surface, a curvature radius of the object side surface is R3, and 20 mm<R3<50 mm.

4. The optical lens according to claim 1, wherein the image side surface of the second lens element is an aspheric surface, a curvature radius of the image side surface is R4, and 10 mm<R4<25 mm.

5. The optical lens according to claim 1, wherein the object side surface of the third lens element is an aspheric surface, a curvature radius of the object side surface is R5, and −10 mm<R5<−1 mm; and the image side surface of the third lens element is an aspheric surface, a curvature radius of the image side surface is R6, and −13 mm<R6<−2 mm.

6. The optical lens according to claim 1, wherein effective focal lengths of the first lens element, the second lens element, and the third lens element are f1, f2, and f3 respectively, satisfying:

8.0 mm<f1<15 mm;

−80 mm<f2<−40 mm; and

−30 mm<f3<−15 mm.

7. The optical lens according to claim 1, wherein center thicknesses of the first lens element, the second lens element, and the third lens element are CT1, CT2, and CT3 respectively, satisfying:

1 mm<CT1<3 mm;

1 mm<CT2<4 mm; and 1 mm<CT3<4 mm.

8. The optical lens according to claim 1, further comprising an aperture, wherein the aperture is disposed between the first lens element and the second lens element.

9. The optical lens according to claim 1, further comprising an infrared filter, wherein the infrared filter is disposed on an image side of the third lens element.

10. The optical lens according to claim 1, further comprising a prism, wherein the prism is disposed on the image side of the third lens element and is used to change a direction of light.

11. A camera module, wherein the camera module comprises an optical lens, and an image sensor, wherein the image sensor is disposed on an image side of the optical lens, wherein the optical lens is from an object side to the image side along an optical axis comprises:

a first lens element having a positive refractive power, wherein an object side surface of the first lens element protrudes and an image side surface of the first lens element protrudes;

a second lens element having a negative refractive power, wherein an object side surface of the second lens element protrudes and an image side surface of the second lens element is recessed; and a third lens element having the negative refractive power, wherein an object side surface of the third lens element is recessed and an image side surface of the third lens element protrudes; wherein Abbe numbers of the first lens element, the second lens element, and the third lens element are V1, V2, and V3 respectively, satisfying:

3.4<V1/V2<3.9, and 0.45<V2/V3<0.55; and an effective focal length of the optical lens is f, and 20 mm<f<25 mm.

12. The camera module according to claim 11, wherein the object side surface of the first lens element is a spherical surface, a curvature radius of the object side surface is R1, and 0 mm<R1<10 mm.

13. The camera module according to claim 11, wherein the image side surface of the first lens element is a spherical surface, a curvature radius of the image side surface is R2, and −28 mm<R2<−10 mm; and the object side surface of the second lens element is an aspheric surface, a curvature radius of the object side surface is R3, and 20 mm<R3<50 mm.

14. The camera module according to claim 11, wherein the image side surface of the second lens element is an aspheric surface, a curvature radius of the image side surface is R4, and 10 mm<R4<25 mm.

15. The camera module according to claim 11, wherein the object side surface of the third lens element is an aspheric surface, a curvature radius of the object side surface is R5, and −10 mm<R5<−1 mm; and the image side surface of the third lens element is an aspheric surface, a curvature radius of the image side surface is R6, and −13 mm<R6<−2 mm.

16. The camera module according to claim 11, wherein effective focal lengths of the first lens element, the second lens element, and the third lens element are f1, f2, and f3 respectively, satisfying:

8.0 mm<f1<15 mm;

−80 mm<f2<−40 mm; and

−30 mm<f3<−15 mm.

17. The camera module according to claim 11, wherein center thicknesses of the first lens element, the second lens element, and the third lens element are CT1, CT2, and CT3 respectively, satisfying:

1 mm<CT1<3 mm;

1 mm<CT2<4 mm; and 1 mm<CT3<4 mm.

18. The camera module according to claim 11, wherein the optical lens further comprises an aperture, wherein the aperture is disposed between the first lens element and the second lens element.

19. The camera module according to claim 11, wherein the optical lens further comprises:

an infrared filter, wherein the infrared filter is disposed on an image side of the third lens element; and/or, a prism, wherein the prism is disposed on the image side of the third lens element and is used to change a direction of light.

20. An electronic device, comprising the camera module according to claim 11.

\* \* \* \* \*